United States Patent
Kang (10) Patent No.: US 7,633,890 B2
(45) Date of Patent: Dec. 15, 2009

(54) COMPATIBLE METHODS AND SYSTEMS FOR MULTIPLE SPANNING TREE PROTOCOLS

(75) Inventor: Chi-Cheng Kang, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 600 days.

(21) Appl. No.: 11/338,752

(22) Filed: Jan. 25, 2006

(65) Prior Publication Data

US 2007/0121672 A1    May 31, 2007

(30) Foreign Application Priority Data

Nov. 29, 2005    (TW) .............................. 94141896 A (51) Int. Cl.
*H04L 12/28* (2006.01)
*H04L 12/56* (2006.01)
*H04J 3/22* (2006.01)
*G06F 15/173* (2006.01)

(52) U.S. Cl. ...................... 370/256; 370/408; 370/469; 709/238

(58) Field of Classification Search ......... 370/254–256, 370/389–392, 400–402, 406–408, 465–467, 370/469

See application file for complete search history.

(56) References Cited

U.S. PATENT DOCUMENTS 7,180,899 B2 * 2/2007 De Silva et al. ........ 370/395.31
7,496,055 B2 * 2/2009 Sugitani et al. ............. 370/256
2003/0053422 A1 * 3/2003 Ambe ......................... 370/256
2005/0206513 A1 * 9/2005 Fallon ......................... 340/506
2006/0045091 A1 * 3/2006 Hata ........................... 370/392

OTHER PUBLICATIONS

Padmaraj et al., Traffic Engineering in Enterprise Ethernet with Multiple Spanning Tree Regions, Feb. 2005, IEEE Computer Society, Systems Communications, ICW.2005.78, pp. 261-266.*
IEEE, 802.1Q IEEE Standards for Local and Metropolitan Area Networks: Virtual Bridged Local Area Networks, May 2003, IEEE Computer Society, pp. 1-327.*
Cisco, Understanding Multiple Spanning—Tree Protocol '802.1s', Jun. 2002, Cisco Systems Doc, ID 24248, pp. 1-14.*
IEEE, P802.1Q-Rev/D5.0 Draft Standards for Local and Metropolitan Area Networks: Virtual Bridged Local Area Networks—Revision, Sep. 2005, IEEE Computer Society, pp. 1-185.*

* cited by examiner

*Primary Examiner*—Tri H Phan
(74) *Attorney, Agent, or Firm*—Birch, Stewart, Kolasch & Birch, LLP (57) ABSTRACT

A compatible method for multiple spanning tree protocols. A verification module is provided between a standard multiple spanning tree (MST) module and a LLC layer and Ethernet driver module. The verification module executes a reception verification procedure and a transmission verification procedure. The verification module, the standard MST module, and the LLC layer and Ethernet driver module are established in a switch. A bridge protocol data unit (BPDU) is received by the verification module. If the BPDU comes from the LLC layer and Ethernet driver module, the verification procedure is executed for the received BPDU. If the BPDU comes from the standard MST module, the transmission verification procedure is executed for the BPDU.

19 Claims, 10 Drawing Sheets

● IEEE standard MST Setting Identity:

FIG. 4c

● Cisco MST Setting Identity:

FIG. 4d

● IEEE standard MST Message:

FIG. 4e

● Cisco MST Message:

COMPATIBLE METHODS AND SYSTEMS FOR MULTIPLE SPANNING TREE PROTOCOLS

BACKGROUND OF THE INVENTION

1. Field of the Invention

The invention relates to manipulation methods of multiple spanning tree (MST) protocols, and in particular to compatible methods and systems for multiple spanning tree (MST) protocols.

2. Description of the Related Art

Generally, spanning tree protocol (STP) is a communication and management method and mechanism based on the IEEE 802.1d Standard. STP is supported in bridge devices of a network and used to reduce path repeats and redundancy thereof. STP also avoids loops in a network topology. Within a network, data is transmitted in packets. A switch is a device to filter or forward data packets among different local area networks (LANs).

With technical progress of networks, a physical LAN is usually divided into various virtual LANs (VLANs). Thus, one single STP cannot suitably fit requirements for the divided VLAN topology and therefore multiple spanning tree protocol (MSTP) is produced. MSTP can properly calculate multiple topologies for a network. A region is a manipulation unit for MSTP and switches located in the same region have the same MST parameters. Once a region is formed, all switches in the formed region are regarded as a large integrated switch.

Figure 1A:
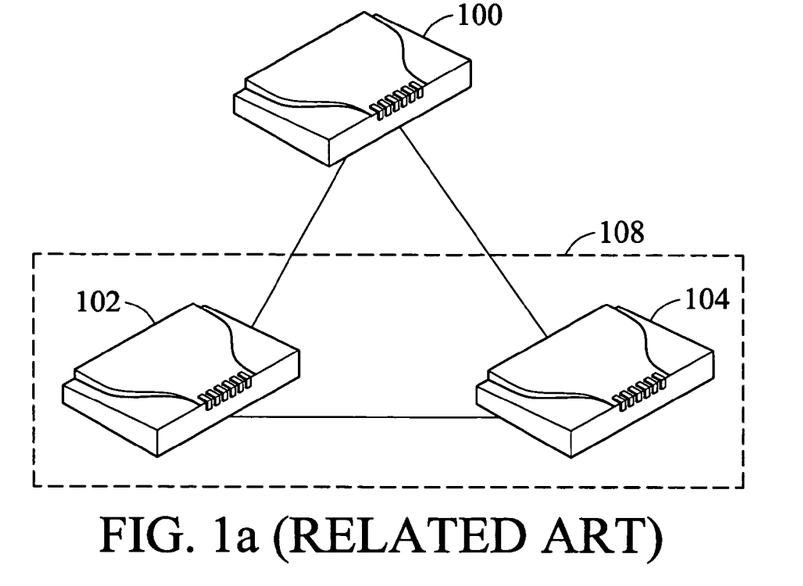
FIGS. 1a to 1c illustrate manipulations of switches conforming to different MST protocols.
Figure 1B:
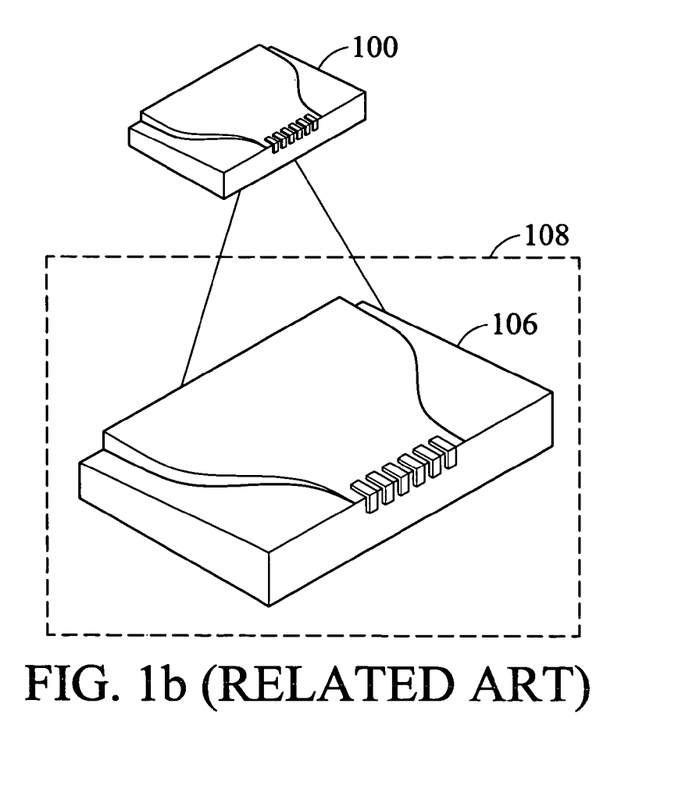
Figure 1C:
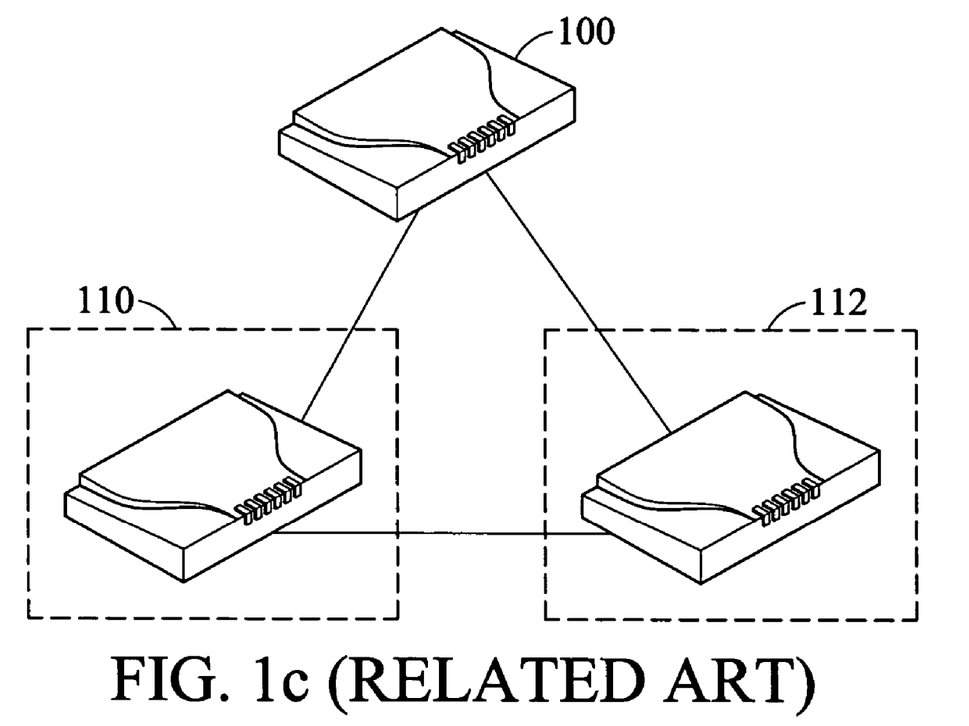

MSTP can be established according to different standards, for example, IEEE 802.1s/802.1q Standard and Cisco Standard. Thus, a switch conforms to IEEE Standard is incompatible with Cisco Standard. Referring to FIGS. 1a-1c, a network environment includes switches 100, 102, and 104. The switch 102 is a Cisco switch (conforming to Cisco Standard) and the switch 104 is a standard switch (conforming to IEEE 802.1 Standard). If the switch 102 and 104 are set to form one region, the ideal region is 108 as shown in FIG. 1b. Because the Cisco switch is not compatible to the standard switch, the actual formed regions are 110 and 112 as shown in FIG. 1c. The Cisco switch forms a region 110 and the standard switch forms another region 112. The regions 110 and 112 cannot be integrated to one region.

Thus, compatible methods and systems for MSTPs are desirable.

BRIEF SUMMARY OF THE INVENTION

A detailed description is given in the following embodiments with reference to the accompanying drawings. Compatible methods and systems for multiple spanning tree protocols are provided. A verification module is provided between a standard multiple spanning tree (MST) module and a LLC layer and Ethernet driver module. The verification module executes a reception verification procedure and a transmission verification procedure. The verification module, the standard MST module, and the LLC layer and Ethernet driver module are established in a switch. A bridge protocol data unit (BPDU) is received by the verification module. If the BPDU comes from the LLC layer and Ethernet driver module, the verification procedure is executed for the received BPDU. If the BPDU comes from the standard MST module, the transmission verification procedure is executed for the BPDU.

BRIEF DESCRIPTION OF THE DRAWINGS

Embodiments of the invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
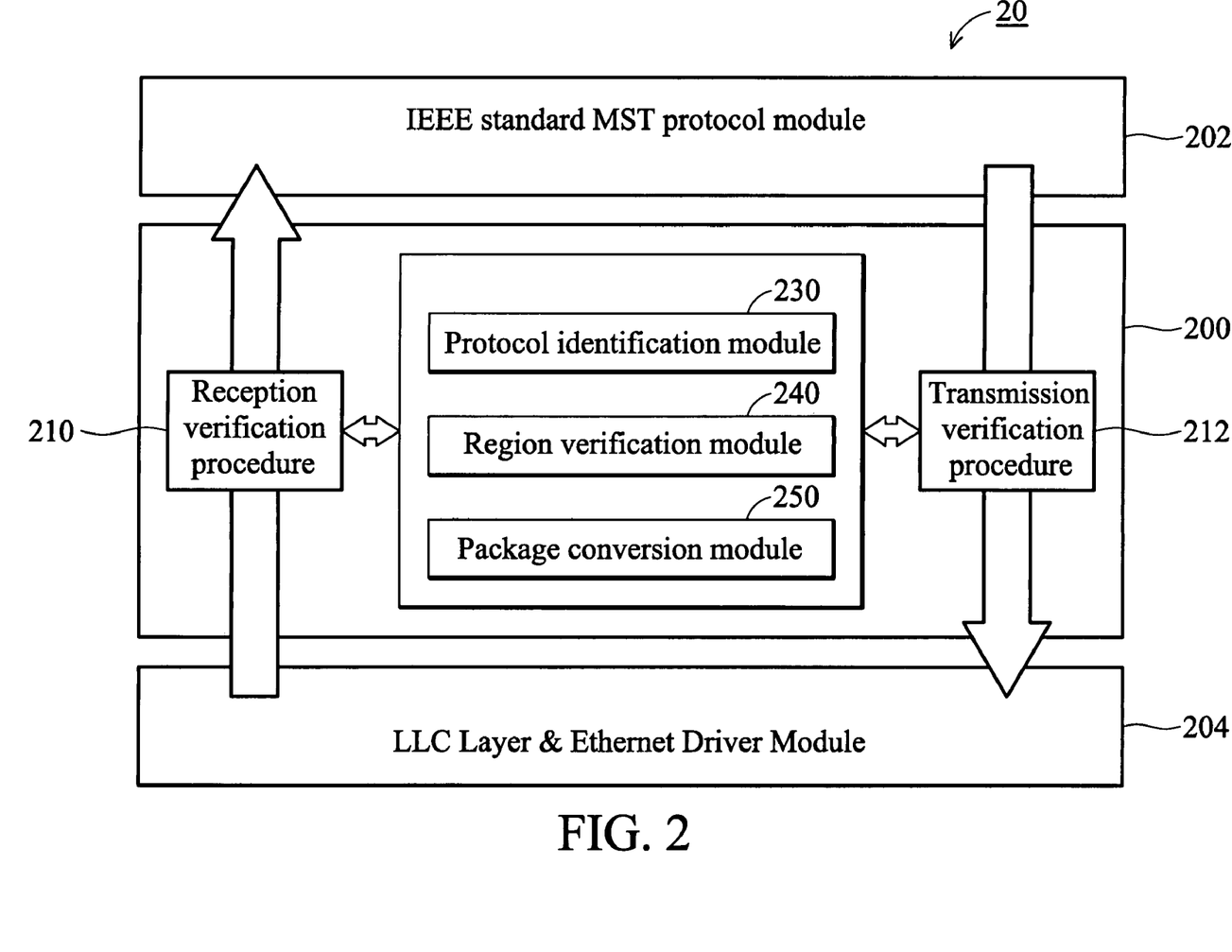
FIG. 2 is a diagram of an embodiment of a switch conforming to different MST protocols.

FIG. 2 is a diagram of an embodiment of a switch conforming to different MST protocols. In one embodiment, a switch 20 is provided and compatible methods for multiple spanning tree protocols are applied thereto. In the embodiment, the switch 20 adopts IEEE standard MST Protocol and Cisco standard MST protocol is compatible to the switch 20.

A verification module 200 is provided between a standard multiple spanning tree (MST) module 202 and a LLC layer and Ethernet driver module 204 for executing a reception verification procedure 210 and a transmission verification procedure 212. The verification module 200 includes a protocol identification module 230, a region verification module 240, and a package conversion module 250. The verification module 200, IEEE standard MST protocol module 202, and LLC layer and Ethernet driver module 204 are established in the switch 20.

The verification module 200 receives, verifies, and adjusts a bridge protocol data unit (BPDU). If the BPDU comes from the LLC layer and Ethernet driver module 204, the reception verification procedure 210 is executed for the BPDU. If the BPDU comes from the IEEE standard MST module 202, the transmission verification procedure 212 is executes.

Figure 3A:
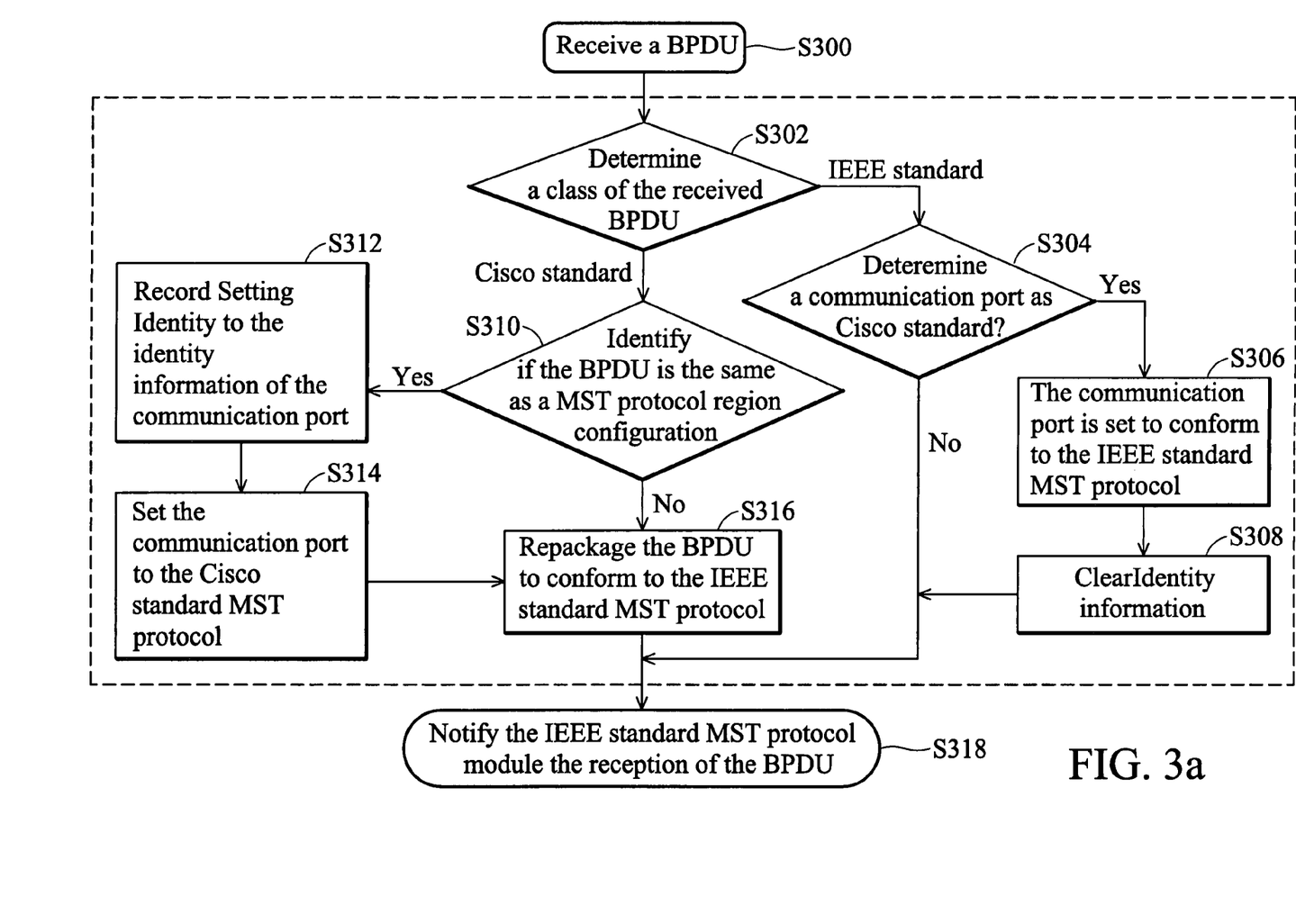
FIG. 3a is a flowchart of an embodiment of a reception verification procedure of a compatible method for MST protocols.

FIG. 3a is a flowchart of an embodiment of a reception verification procedure of a compatible method for MST protocols. A BPDU is first received by the LLC layer and Ethernet driver module 204 (step S300). The protocol identification module 230 determines a class of the received BPDU (step S302).

If the BPTU conforms to IEEE standard MST protocol, a communication port receiving the BPDU of the switch is determined if it is recorded as Cisco standard MST protocol (step S304). If the communication port is recorded as the Cisco standard MST protocol, the communication port is set to conform to the IEEE standard MST protocol (step S306). Setting Identity information is cleared after the setting of the communication port (step S308).

In step S302, if the BPDU conforms to the Cisco standard MST protocol, the region verification module 240 identifies if the BPDU is the same as a MST protocol region configuration of the switch (step S310). If the BPDU is the same as the MST protocol region configuration of the switch, the Setting Identity 412 of the received BPDU, as shown in FIG. 4b, is recorded to the identity information of the communication port receiving the BPDU (step S312) and the communication port is then set to conform to the Cisco standard MST protocol (step S314).

Finally, if the BPDU conforms to the Cisco standard MST protocol, the BPDU is repackaged to conform to the IEEE standard MST protocol (step S316). Thereafter, the IEEE standard MST protocol module is notified by the reception of the BPDU (step S318).

Figure 4A:
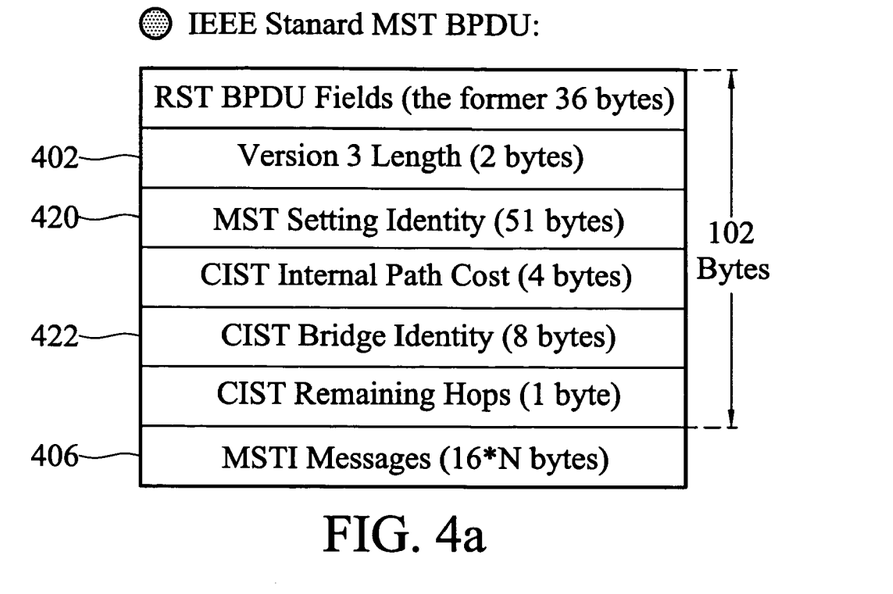
FIG. 4a is a diagram of an embodiment of a BPDU of IEEE standard MST Protocol.
Figure 4B:
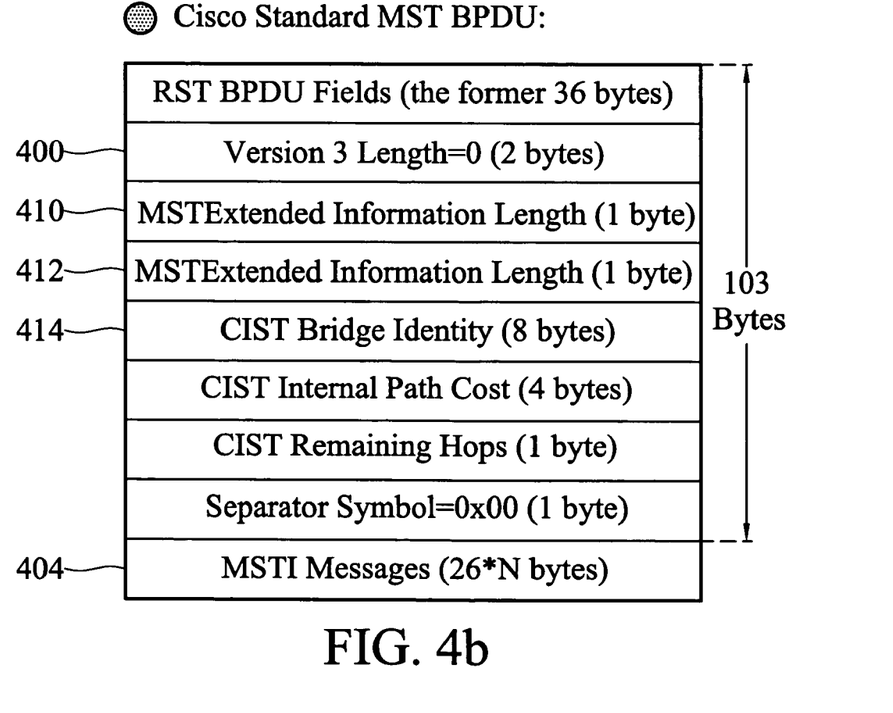
FIG. 4b is a diagram of an embodiment of a BPDU of Cisco standard MST Protocol.

Here, determination of the class of the BPDU executed by the protocol identification module 230 is shown in FIGS. 4a-4b. FIG. 4a is a diagram of an embodiment of a BPDU of IEEE standard MST Protocol. FIG. 4b is a diagram of an embodiment of a BPDU of Cisco standard MST Protocol. Determination of the class of the BPDU may be accomplished by one or more the following judgment steps. If a value of a Version 3 Length field of the BPDU is zero, if a value of a MST Extended Information field of the BPDU is larger than or equal to 64, if a total length of the BPDU minus 38 is larger than or equal to the value of the MST Extended Information field of the BPDU, if the total length of the BPDU minus 103 is a multiple of 26, and if the value of the MST Extended Information field of the BPDU minus 64 is a multiple of 26.

Figure 4C:
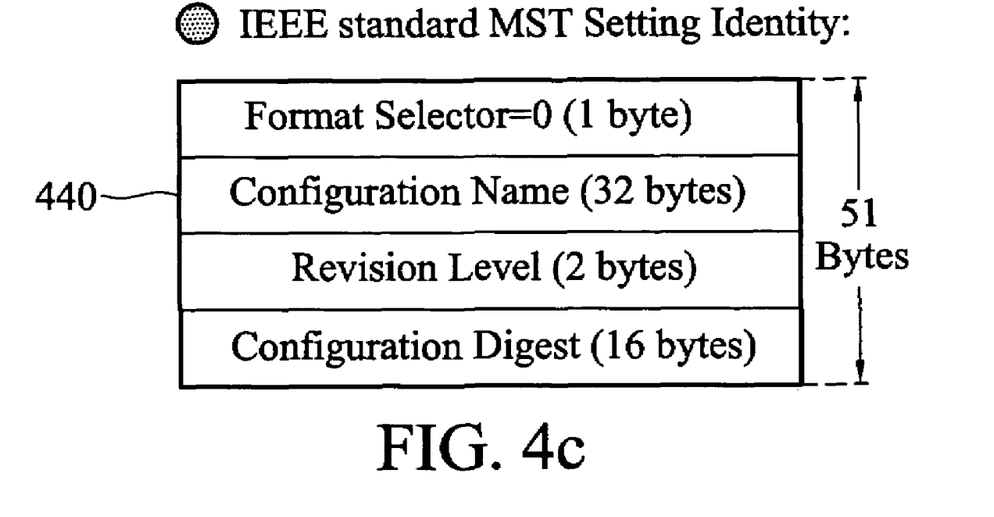
FIG. 4c is a diagram of an embodiment of a Setting Identity field of a BPDU of IEEE standard MST Protocol.
Figure 4D:
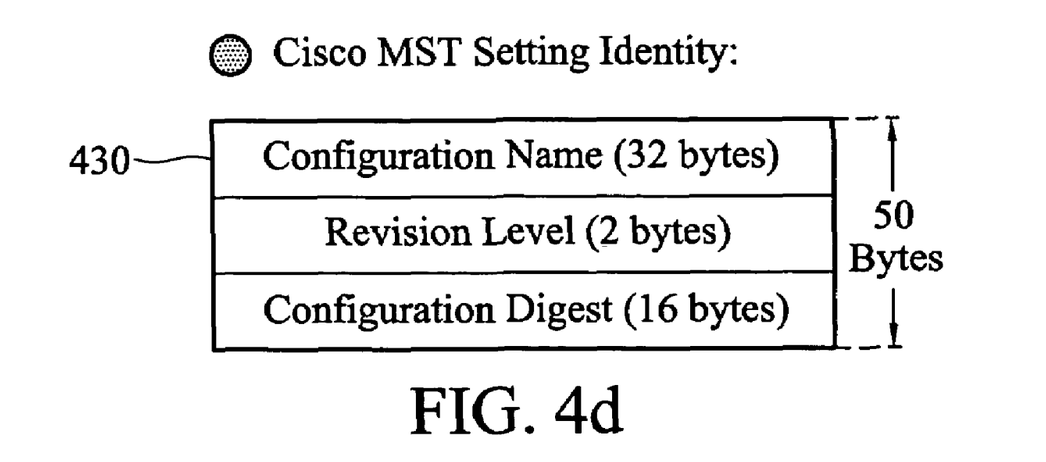
FIG. 4d is a diagram of an embodiment of a Setting Identity field of a BPDU of Cisco standard MST Protocol.

Region verification executed by the region verification module 240 is shown in FIGS. 4c-4d. FIG. 4c is a diagram of an embodiment of a setting identification code field 420 of a BPDU of IEEE standard MST Protocol. FIG. 4d is a diagram of an embodiment of a Setting-Identity field 412 of a BPDU of Cisco standard MST Protocol. Identification of the sameness of the BPDU and the MST protocol region configuration of the switch can be accomplished by one or more the following steps. If a Configuration Name field 430 of the Setting Identity field 412 of the BPDU is the same as a configuration name of the switch and if a MSTI message amount of the BPDU is the same as a valid spanning tree amount of the switch.

Figure 4E:
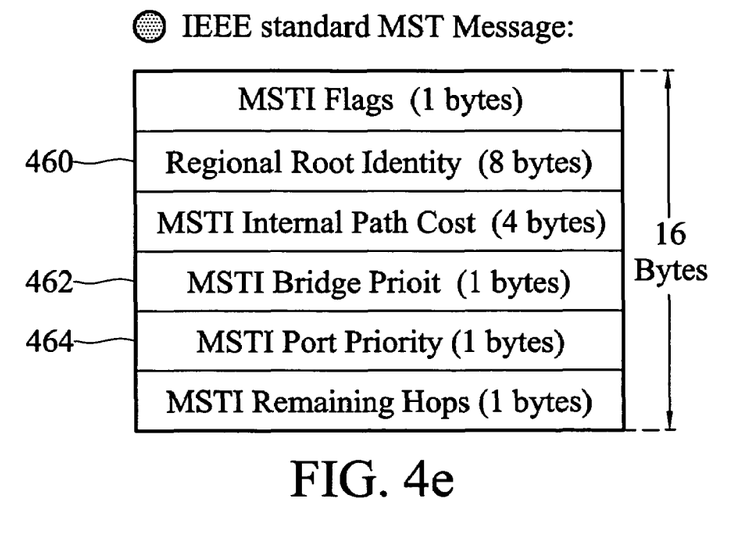
FIG. 4e is a diagram of an embodiment of a MSTI Message field of a BPDU of IEEE standard MST Protocol.
Figure 4F:
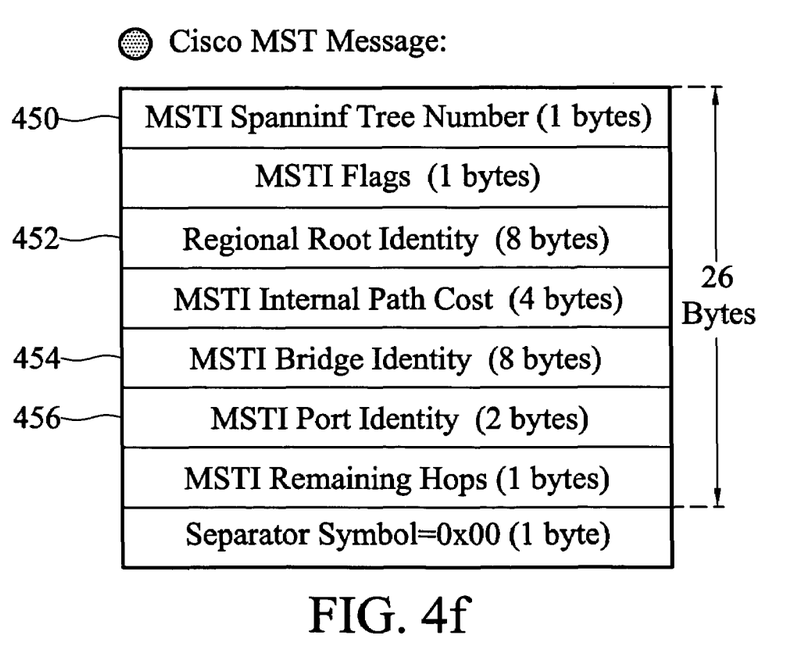
FIG. 4f is a diagram of an embodiment of a MSTI Message field of a BPDU of Cisco standard MST Protocol.

Repackage executed by the package conversion module 250 is shown in FIGS. 4a-4b and 4e-4f. FIG. 4a is a diagram of an embodiment of a BPDU of IEEE standard MST Protocol. FIG. 4b is a diagram of an embodiment of a BPDU of Cisco standard MST Protocol. FIG. 4e is a diagram of an embodiment of a MSTI Message field 406 of a BPDU of IEEE standard MST Protocol. FIG. 4f is a diagram of an embodiment of a MSTI Message field 404 of a BPDU of Cisco standard MST Protocol. The packaging format of the Cisco standard MST protocol (FIG. 4b) is converted to the IEEE standard MST protocol (FIG. 4a) by converting the value of the Extended Information field 410 (64+26×N) to the value of the Version 3 Length field 402 (64+16×N), copying MST protocol region configuration code information of the switch to the value of the Setting Identity field 420, and modifying rest fields correspondingly. The MSTI Message field of a BPDU conforming to the Cisco standard MST protocol (FIG. 4f) is converted to the IEEE standard MST protocol (FIG. 4e) by replacing the second byte of the Regional Root Identity field 452 to MSTI Spanning Tree Number field 450 and then setting the value of the Regional Root Identity field 460 to the Regional Root Identity field 452, setting the first byte of the MSTI Bridge Identity 454 as the value of the MSTI Bridge Priority field 462, setting the first byte of the MSTI Port Identity field 464 as the value of the MSTI Port Priority field 464, and setting other fields correspondingly.

Figure 3B:
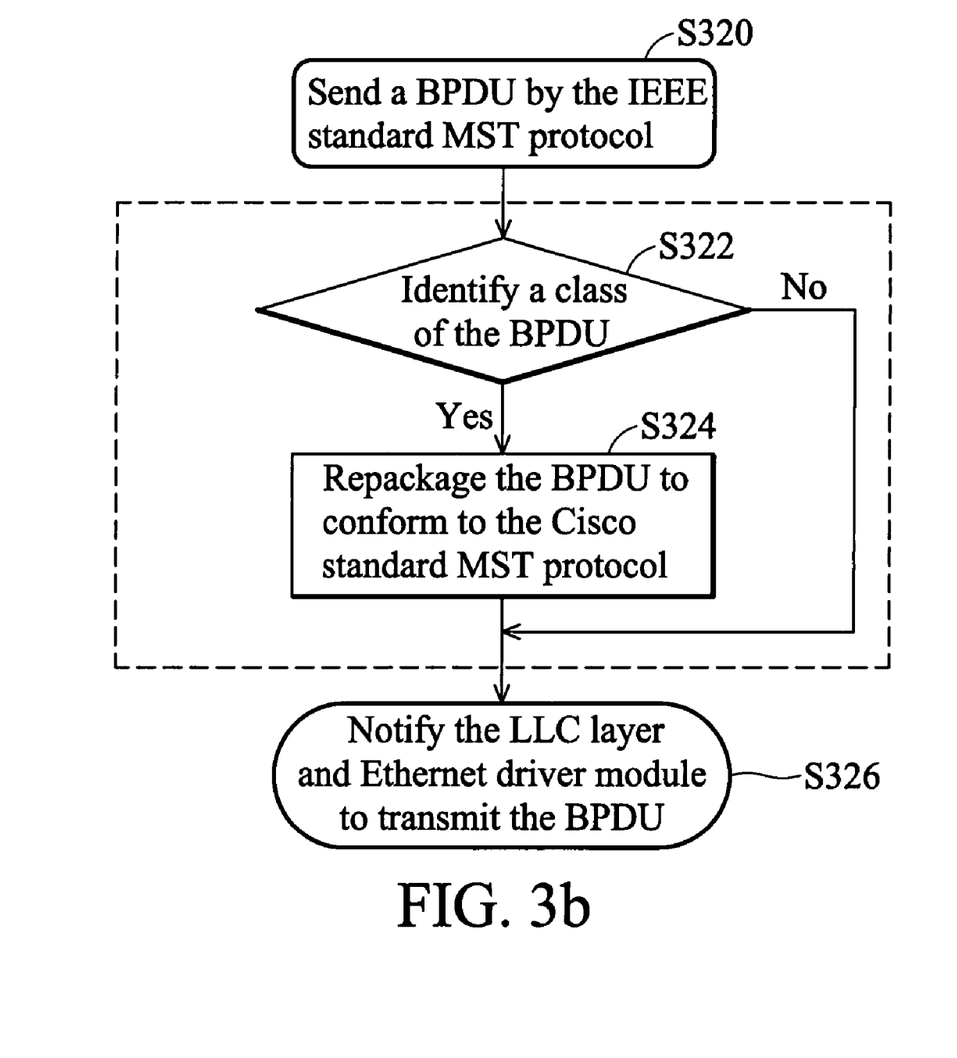
FIG. 3b is a flowchart of an embodiment of a transmission verification procedure of a compatible method for MST protocols.

FIG. 3b is a flowchart of an embodiment of a transmission verification procedure 212 of a compatible method for MST protocols. A BPDU is first sent by the IEEE standard MST protocol (step S320). A class of the BPDU is identified by the protocol identification module 230 (step S322).

If a communication port of the switch sending the BPDU is determined as the Cisco standard MST protocol, the BPDU is repackaged to conform to the Cisco standard MST protocol by the package conversion module 250 (step S324). Thereafter, the LLC layer and Ethernet driver module 204 is notified to transmit the BPDU (step S326).

Repackage executed by the package conversion module 250 is shown in FIGS. 4a-4b and 4e-4f. FIG. 4a is a diagram of an embodiment of a BPDU of IEEE standard MST protocol. FIG. 4b is a diagram of an embodiment of a BPDU of Cisco standard MST protocol. FIG. 4e is a diagram of an embodiment of a MSTI Message field 406 of a BPDU of IEEE standard MST Protocol. FIG. 4f is a diagram of an embodiment of a MSTI Message field 404 of a BPDU of Cisco standard MST protocol. The package format of the IEEE standard MST protocol (FIG. 4a) is converted to the Cisco standard MST protocol (FIG. 4b) by converting the value of the Version 3 Length field 402 (64+16×N) to the value of the Extended Information field 410 (64+26×N) and setting the Version 3 Length field to zero, copying the identity information record of the communication port transmitting the package of the switch to the Setting Identity field 412, and modifying rest fields correspondingly. The MSTI message field of the IEEE standard MST protocol (FIG. 4e) is converted to the Cisco standard MST protocol (FIG. 4f) by setting the value of the Regional Root Identity field 460 to the value of the Regional Root Identity field 452, setting the second byte of the Regional Root Identity field 460 to the value of the MSTI Number 450, replacing the first byte of the CIST Bridge Identity field 422 to the MSTI Bridge Priority 462 and setting the CIST Bridge Identity field 422 to the MSTI Bridge Identity 454, composing the MSTI Port Priority 464 with the port number of the switch for transmitting the BPDUs to the MSTI Port Identity 456, and modifying other fields correspondingly.

Back to FIG. 2, FIG. 2 is a diagram of an embodiment of a switch conforming to different MST protocols. A compatible system 20 for multiple spanning tree protocols is provided. The provided system 20 includes verification module 200. The verification module 200 comprises protocol identification 230, region verification module 240, and package conversion module 250. The verification module 200 is established between a standard MST module 202 and a LLC layer and Ethernet driver module 204 for executing a reception verification procedure 210 and a transmission verification procedure 212. The verification module, the standard MST module, and the LLC layer and Ethernet driver module are established in the switch 20.

The protocol identification module 230 identifies a class of a BPDU and provides MST protocol records of a communication port for the reception and transmission verification procedures.

The region verification module 240 verifies a region for a BPDU and provides identity information records of a communication port for the reception and transmission verification procedures.

The package conversion module 250 packages BPDUs in various formats for the reception and transmission verification procedures. The package conversion module 250 can convert BPDUs from the IEEE standard MST protocol to the Cisco standard MST protocol and reversely.

Figure 5A:
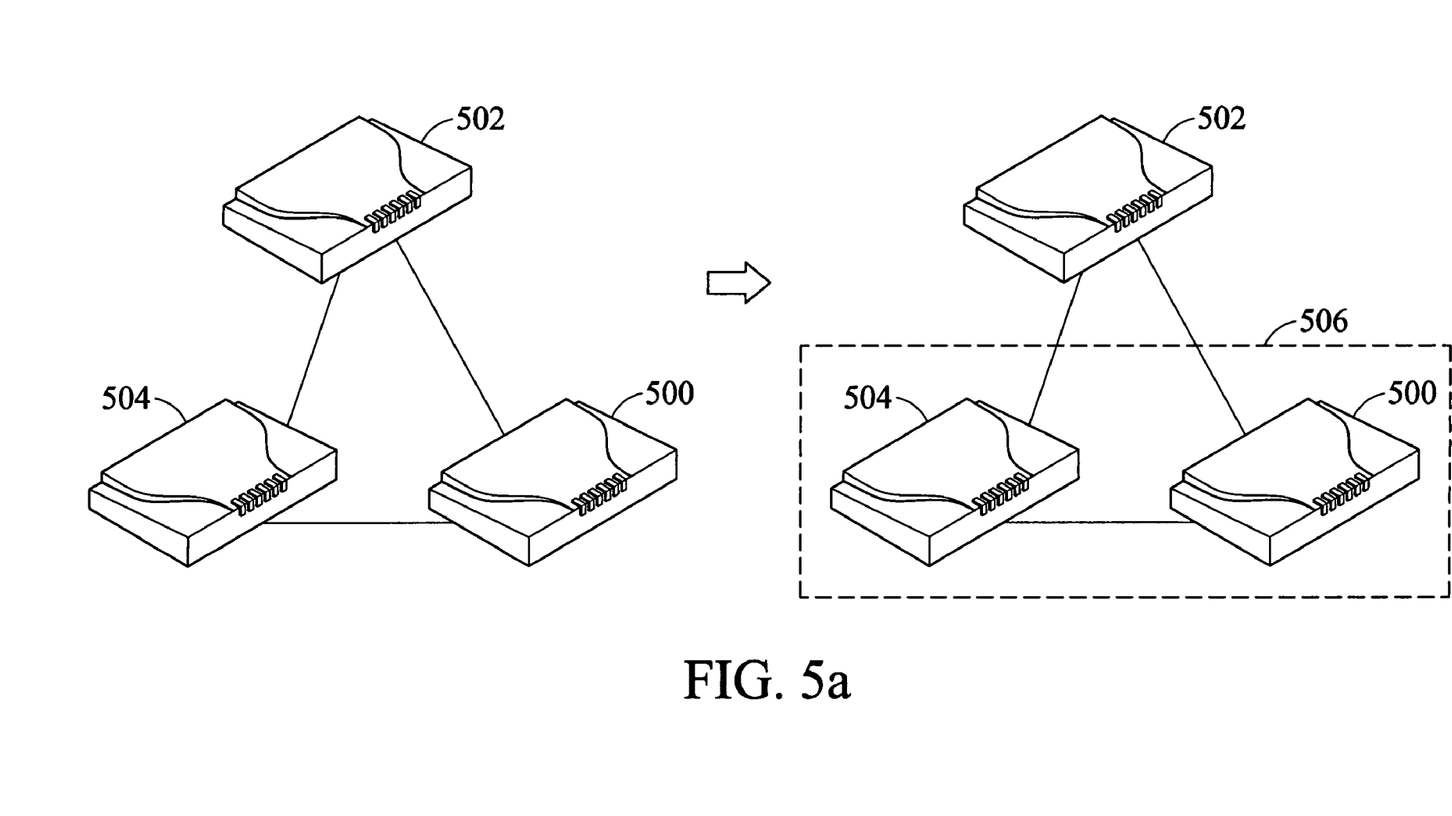
FIG. 5a is a diagram of an exemplary implementation of a compatible system for MST protocols.
Figure 5B:
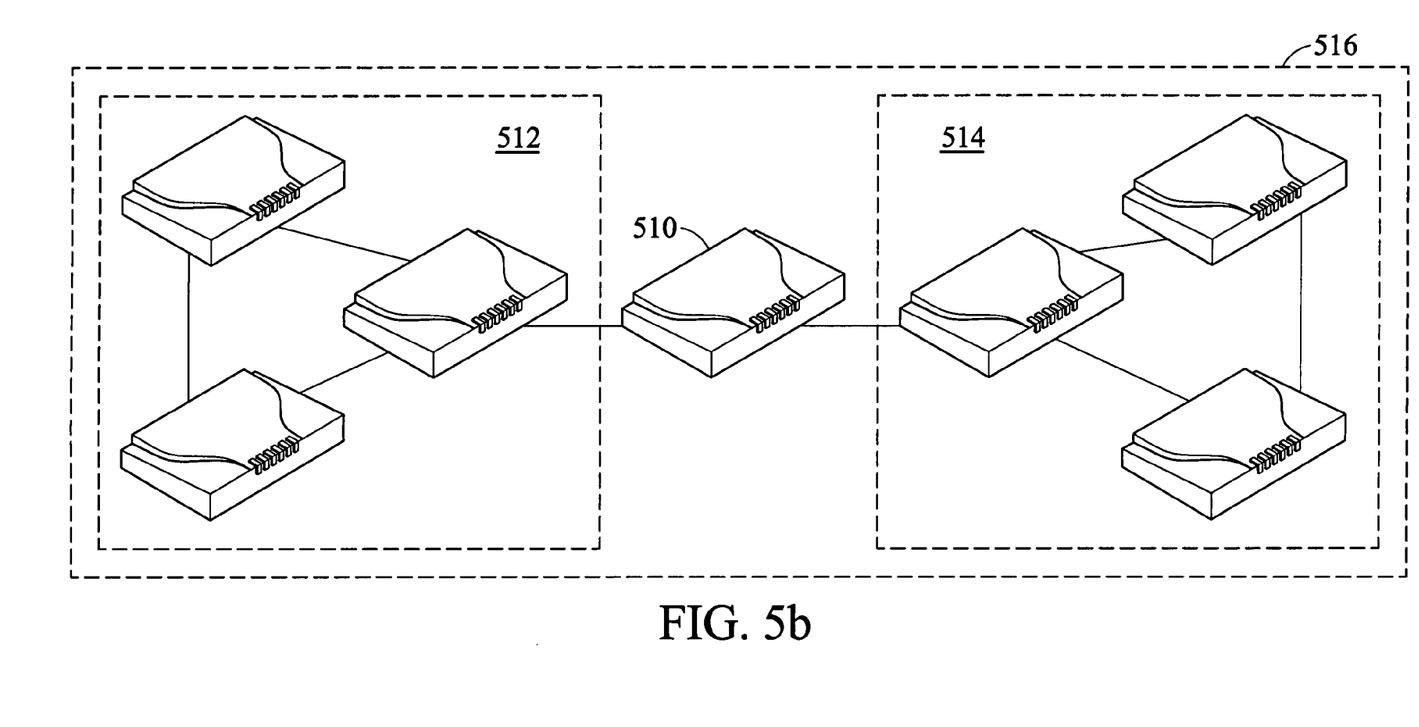
FIG. 5b is a diagram of another exemplary implementation of a compatible system for MST protocols.

Referring to FIG. 5a-5b, FIG. 5a is a diagram of an exemplary implementation of a compatible system for MST protocols and FIG. 5b is a diagram of another exemplary implementation of a compatible system for MST protocols. As shown in FIG. 5a, three switches 500, 502, and 504 are in a network. Here, the switch 500 is established by the mentioned methods (hereinafter called enhanced switch). The switch 504 is a switch conforming to the Cisco standard MST protocol (hereinafter called Cisco switch). The switch 502 is an common switch conforming to other MST protocols (hereinafter called other switch). When the Cisco switch 504 and the enhanced switch 500 are set into the same region, the enhanced switch 500 and the Cisco switch can form a integrated region 506, as the ideal situation.

FIG. 5b shows a complicated network. The switch 510 is an enhanced switch. Region 514 is formed by multiple Cisco switches and region 516 is formed by multiple standard switches (conforming to IEEE standard MST protocol). The enhanced switch 510 is established between the region 514 and region 516. Thus, the ideal MST region 516 is formed.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A compatible method for multiple spanning tree protocols, comprising:
providing a verification module between a standard multiple spanning tree (MST) module and a LLC layer and Ethernet driver module for executing a reception verification procedure and a transmission verification procedure, wherein the verification module, the standard MST module, and the LLC layer and Ethernet driver module are established in a switch;
receiving a bridge protocol data unit (BPDU); and
executing the reception verification procedure when the BPDU comes from the LLC layer and Ethernet driver module and executing the transmission verification procedure when the BPDU comes from the standard MST module,
wherein when the verification module executes the reception verification procedure and the transmission verification procedure, required functions and parameters are provided by the verification module comprising a protocol identification module, a region verification module, and a package conversion module.

2. The compatible method for multiple spanning tree protocols as claimed in claim 1, wherein the transmission verification procedure comprises:
determining if a communication port of the switch conforms to a second MST protocol; and
packaging the BPDU conforming to the second MST protocol when the communication port conforming to the second MST protocol.

3. A compatible method for multiple spanning tree protocols, comprising:
providing a verification module between a standard multiple spanning tree (MST) module and a LLC layer and Ethernet driver module for executing a reception verification procedure and a transmission verification procedure, wherein the verification module, the standard MST module, and the LLC layer and Ethernet driver module are established in a switch;
receiving a bridge protocol data unit (BPDU);
executing the reception verification procedure when the BPDU comes from the LLC layer and Ethernet driver module and executing the transmission verification procedure when the BPDU comes from the standard MST module, wherein the reception verification procedure comprises:
determining a class of the BPDU, wherein the classes comprise a first MST protocol and a second MST protocol;
determining if a communication port of the switch is recorded as the second MST protocol when the BPDU conforms to the first MST protocol;
setting the communication port conforming to the first MST protocol when the communication port is recorded as the second MST protocol;
identifying if the BPDU is the same as a MST protocol region configuration of the switch when the BPDU conforms to the second MST protocol;
setting the communication port conforming to the second MST protocol when the BPDU is the same as the MST protocol region configuration of the switch; and
packaging the BPDU conforming to the first MST protocol when the BPDU conforms to the second MST protocol.

4. The compatible method for multiple spanning tree protocols as claimed in claim 3, wherein determination of the class of the BPDU is accomplished by at least one step, comprising:
determining if a value of a Version 3 Length field of the BPDU is zero;
determining if a value of a MST Extended Information field of the BPDU is larger than or equal to 64;
determining if a total length of the BPDU minus 38 is larger than or equal to the value of the MST Extended Information field of the BPDU;
determining if the total length of the BPDU minus 103 is a multiple of 26; and
determining if the value of the MST Extended Information field of the BPDU minus 64 is a multiple of 26.

5. The compatible method for multiple spanning tree protocols as claimed in claim 3, further clearing identity information after setting the communication port conforming to the second MST protocol, wherein the identity information indicates information related to the first MST protocol transmission data and is recorded in the communication port of the BPDU.

6. The compatible method for multiple spanning tree protocols as claimed in claim 3, further recording identity information before setting the communication port conforming to the second MST protocol, wherein the identity information indicates information related to the first MST protocol transmission data and is recorded in the communication port of the BPDU.

7. The compatible method for multiple spanning tree protocols as claimed in claim 3, wherein identification of the sameness of the BPDU and the MST protocol region configuration of the switch is accomplished by at least one step, comprising:
identifying if a Configuration Name field of the BPDU is the same as a configuration name field of the switch; and
identifying if a MSTI Message amount of the BPDU is the same as a valid spanning tree amount of the switch.

8. The compatible method for multiple spanning tree protocols as claimed in claim 3, wherein the first MST protocol is IEEE standard MST protocol, a MST protocol of the switch.

9. The compatible method for multiple spanning tree protocols as claimed in claim 3, wherein the second MST protocol is Cisco standard MST protocol, a MST protocol compatible to the switch.

10. compatible system for multiple spanning tree protocols, comprising:
a verification module, established between a standard multiple spanning tree (MST) module and a LLC layer and Ethernet driver module for executing a reception verification procedure and a transmission verification procedure, wherein the verification module, the standard MST module, and the LLC layer and Ethernet driver module are established in a switch;
wherein the verification module further comprises:
a protocol identification module, identifying a class of a bridge protocol data unit (BPDU) and providing MST protocol records for a communication port;
a region verification module, verifying a region for a BPDU and providing identity information records of a communication port; and
a package conversion module, packaging BPDUs in various formats;
wherein when the verification module executes the reception verification procedure and the transmission verification procedure, required functions and parameters are provided by the protocol identification module, the region verification module, and the package conversion module.

11. The compatible system for multiple spanning tree protocols as claimed in claim 10, wherein the verification module executes the reception verification procedure by:
determining a class of the BPDU, wherein the classes comprise a first MST protocol and a second MST protocol;
determining if a communication port of the switch is recorded as the second MST protocol when the BPDU conforms to the first MST protocol;
setting the communication port conforming to the first MST protocol when the communication port is recorded as the second MST protocol;
identifying if the BPDU is the same as a MST protocol region configuration of the switch when the BPDU conforms to the second MST protocol;
setting the communication port conforming to the second MST protocol when the BPDU is the same as the MST protocol region configuration of the switch; and
packaging the BPDU conforming to the first MST protocol when the BPDU conforms to the second MST protocol.

12. The compatible system for multiple spanning tree protocols as claimed in claim 11, wherein determination of the class of the BPDU is provided by the protocol identification module and accomplished by at least one step, comprising:
determining if a value of a Version 3 Length field of the BPDU is zero;
determining if a value of a MST Extended Information field of the BPDU is larger than or equal to 64;
determining if a total length of the BPDU minus 38 is larger than or equal to the value of the MST Extended Information field of the BPDU;
determining if the total length of the BPDU minus 103 is a multiple of 26; and
determining if the value of the MST Extended Information field of the BPDU minus 64 is a multiple of 26.

13. The compatible system for multiple spanning tree protocols as claimed in claim 11, wherein the protocol identification module further clears identity information after setting the communication port conforming to the second MST protocol, and the identity information indicates information related to the first MST protocol transmission data and is recorded in a communication port of the BPDU.

14. The compatible system for multiple spanning tree protocols as claimed in claim 11, wherein the protocol identification module further records identity information before setting the communication port conforming to the second MST protocol, and the identity information indicates information related to the first MST protocol transmission data and is recorded in a communication port of the BPDU.

15. The compatible system for multiple spanning tree protocols as claimed in claim 11, wherein identification of the sameness of the BPDU and the MST protocol region configuration of the switch is provided by the region verification module and accomplished by at least one step, comprising:
identifying if a Configuration Name field of the BPDU is the same as a configuration name field of the switch; and
identifying if a MSTI Message amount of the BPDU is the same as a valid spanning tree amount of the switch.

16. The compatible system for multiple spanning tree protocols as claimed in claim 11, wherein the first MST protocol is IEEE standard MST protocol, a MST protocol of the switch.

17. The compatible system for multiple spanning tree protocols as claimed in claim 10, wherein a second MST protocol is Cisco standard MST protocol, a MST protocol compatible to the switch.

18. The compatible system for multiple spanning tree protocols as claimed in claim 10, wherein the verification module executes the transmission verification module by:
determining if a communication port of the switch conforms to a second MST protocol; and
packaging the BPDU conforming to the second MST protocol when the communication port conforming to the second MST protocol.

19. The compatible system for multiple spanning tree protocols as claimed in claim 10, wherein the compatible system for multiple spanning tree protocols is implemented as a switch.

* * * * *